(12) United States Patent  
Perrow

(10) Patent No.: US 6,840,863 B2  
(45) Date of Patent: Jan. 11, 2005

(54) NEEDLE ROLLER RETENTION DESIGN FOR TRIPOT JOINT

(75) Inventor: Scott J. Perrow, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 62 days.

(21) Appl. No.: 10/157,330

(22) Filed: May 29, 2002

(65) Prior Publication Data

US 2003/0224859 A1 Dec. 4, 2003

(51) Int. Cl.[7] .............................................. F16D 3/205
(52) U.S. Cl. ...................... 464/111; 464/130; 384/564
(58) Field of Search ................... 464/111, 128, 464/129, 130, 132, 905, 124, 131; 384/564; 277/550, 574

(56) References Cited

U.S. PATENT DOCUMENTS

| | | | |
|---|---|---|---|
| 452,751 A | * | 5/1891 | Eveland ...................... 384/564 |
| 2,057,102 A | * | 10/1936 | Lernell ....................... 384/564 |
| 3,054,620 A | * | 9/1962 | Schwing ..................... 277/574 |
| 3,519,316 A | * | 7/1970 | Gothberg ................ 277/574 X |
| 4,224,806 A | | 9/1980 | Kobayashi |
| 4,440,401 A | * | 4/1984 | Olschewski et al. .... 464/131 X |
| 4,708,693 A | * | 11/1987 | Orain ......................... 464/111 |
| 4,747,803 A | | 5/1988 | Kimata et al. |
| 4,810,232 A | | 3/1989 | Farrell et al. |
| 5,019,016 A | | 5/1991 | Uchman |
| 5,171,185 A | | 12/1992 | Schneider |
| 5,379,480 A | * | 1/1995 | Lo .......................... 277/550 X |
| 5,380,249 A | | 1/1995 | Krude |
| 5,391,013 A | | 2/1995 | Ricks et al. |
| 5,496,217 A | | 3/1996 | Perrow et al. |
| 5,503,408 A | * | 4/1996 | Hemann et al. ......... 277/574 X |
| 5,507,693 A | | 4/1996 | Schwarzler et al. |
| 5,525,109 A | | 6/1996 | Hofmann et al. |
| 5,603,509 A | * | 2/1997 | Stoll et al. ................. 277/550 |
| 5,658,199 A | | 8/1997 | Ricks et al. |
| 6,074,303 A | | 6/2000 | Perrow et al. |
| 6,176,786 B1 | | 1/2001 | Wormsbaecher |
| 6,190,260 B1 | | 2/2001 | Flores et al. |
| 6,217,454 B1 | | 4/2001 | Ikeda et al. |
| 6,318,737 B1 | | 11/2001 | Marechal et al. |
| 6,390,926 B1 | | 5/2002 | Perrow |
| 6,533,667 B2 | | 3/2003 | Perrow et al. |
| 2001/0001899 A1 | | 5/2001 | Sams et al. |
| 2001/0049309 A1 | | 12/2001 | Perrow |

FOREIGN PATENT DOCUMENTS

DE              639 088      * 11/1936   ................. 384/564

* cited by examiner

*Primary Examiner*—Greg Binda  
(74) *Attorney, Agent, or Firm*—Michael D. Smith

(57) ABSTRACT

A needle roller retainer for insertion into an outer ball of a tripot style joint includes a cylindrical portion having an inner end and an outer end, a rib portion extending from the inner end of the cylindrical portion, and a flange portion extending from the outer end of the cylindrical portion. The outer ball includes a groove for receiving the rib portion.

19 Claims, 3 Drawing Sheets

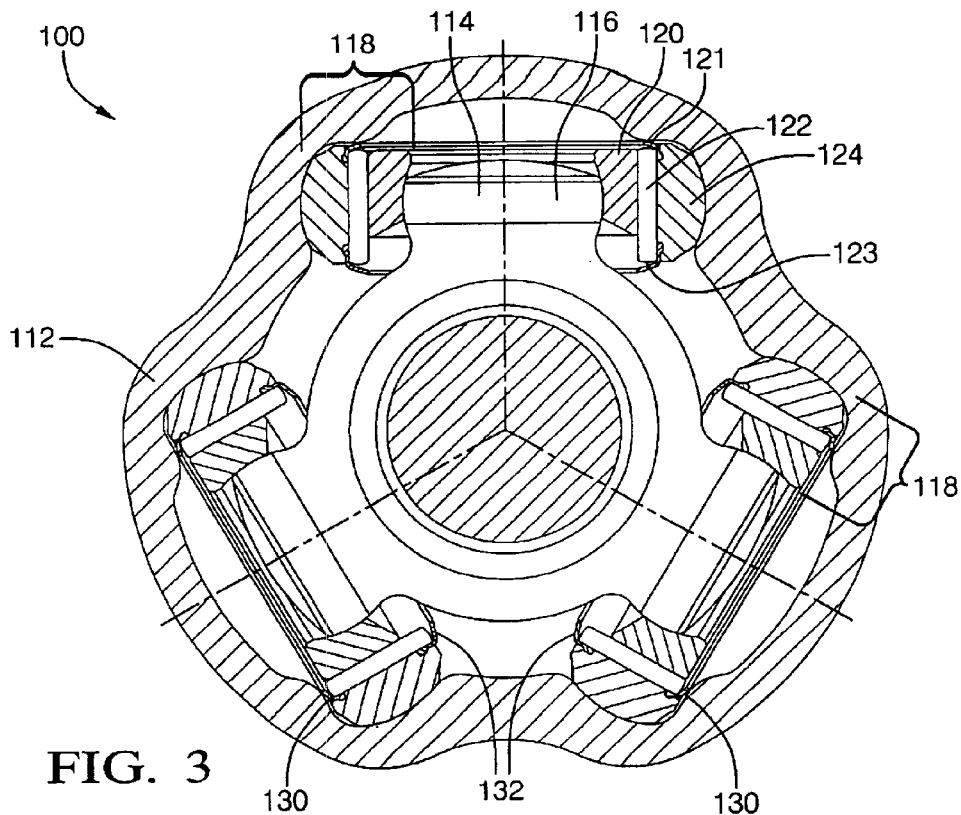
FIG. 3
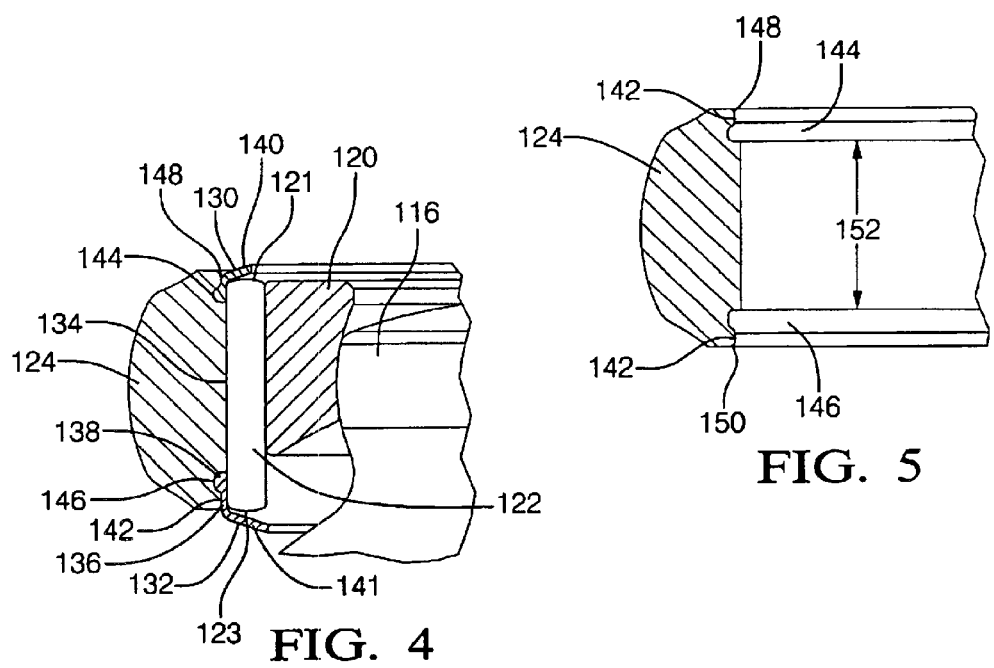
FIG. 4
FIG. 5

NEEDLE ROLLER RETENTION DESIGN FOR TRIPOT JOINT

BACKGROUND OF THE INVENTION

This invention relates to tripot style joints, and more particularly, this invention relates to a tripot joint having a retainer for needle rollers.

A tripot style joint is usable as one type of constant velocity ("CV") joint on a drive axle of a vehicle. A CV joint is used to transfer a uniform torque and a constant speed, while operating through a wide range of angles. The CV joint is preferably quite compact so as to allow the drive axle to rotate at a constant velocity, regardless of the operating angle.

Turning now to FIG. 1, a tripot style joint 10 includes a tripot housing 12 formed with a ball guide, the interior grooves of the housing 12. That is, the housing 12 has an offset radius profile for the ball bore and an outer ball guide to help track the outer ball relative to the housing axis. A tripot spider 14 includes a somewhat spherical trunnion 16, a ball assembly 18 having an inner ball 20, a complement of needle rollers 22, and an outer ball 24. The inner ball 20 has a spherical radius profile on the inner diameter that mates to the spherical profile of the spider trunnion 16 and a cylindrical outer diameter that mates with the needle rollers 22. The compliment of needle rollers 22 mates to the outer diameter of the inner ball 20 and the inner diameter of the outer ball 24. The outer ball 24 has a cylindrical inner diameter and a radius profile outer diameter to match the ball bore of the housing 12. As shown in FIG. 2, the inner diameter of the outer ball 24 is designed with two shoulders 26 that form a cup. The cup area contains the compliment of needle rollers 22.

The primary function of such a tripot joint 10 is to reduce axial forces generated during the operation of the joint 10 within a vehicle. The generated axial forces create a ride disturbance in the vehicle called "shudder". The reduction to the generated axial forces is accomplished by tracking either the outer ball 24 or the ball assembly 18 relative to the axis of the housing 12.

A problem with the joint design shown in FIG. 1 is the design of the outer ball 24. The inner diameter profile of the outer ball 24 that forms the cup shape is very expensive to manufacture.

U.S. Pat. No. 5,658,199 to Ricks et al. describes an alternative to the cup design which uses two securing rings. Because of the design of the securing rings, the width of the outer ball must be increased to accommodate grooves for the retaining rings. Any increase to the width of the outer ball requires the overall diameter of the housing to be increased. Therefore, affecting both the package size and the mass of this style joint.

BRIEF SUMMARY OF THE INVENTION

The above discussed and other drawbacks and deficiencies are overcome or alleviated by a needle roller retainer for insertion into an outer ball of a tripot style joint. The retainer may include a cylindrical portion having an inner end and an outer end, a rib portion extending from the inner end of the cylindrical portion, and a flange portion extending from the outer end of the cylindrical portion.

The needle roller retainer may be used in a ball assembly for a tripot style joint, the ball assembly including an outer ball having a cylindrical shape and having a first ring shaped groove on an interior of the cylindrical shape. The rib portion of the first needle roller retainer may then fit snugly within the first ring shaped groove.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several FIGS.:

FIG. 3 is a cross-sectional view of a tripot style joint;

FIG. 4 is an enlarged partial cross-sectional view of the ball assembly and retainer rings used in the tripot style joint of FIG. 3;

FIG. 5 is an enlarged partial cross-sectional view of the outer ball used in the tripot style joint of FIG. 3;

DETAILED DESCRIPTION OF THE INVENTION

Figure 1:
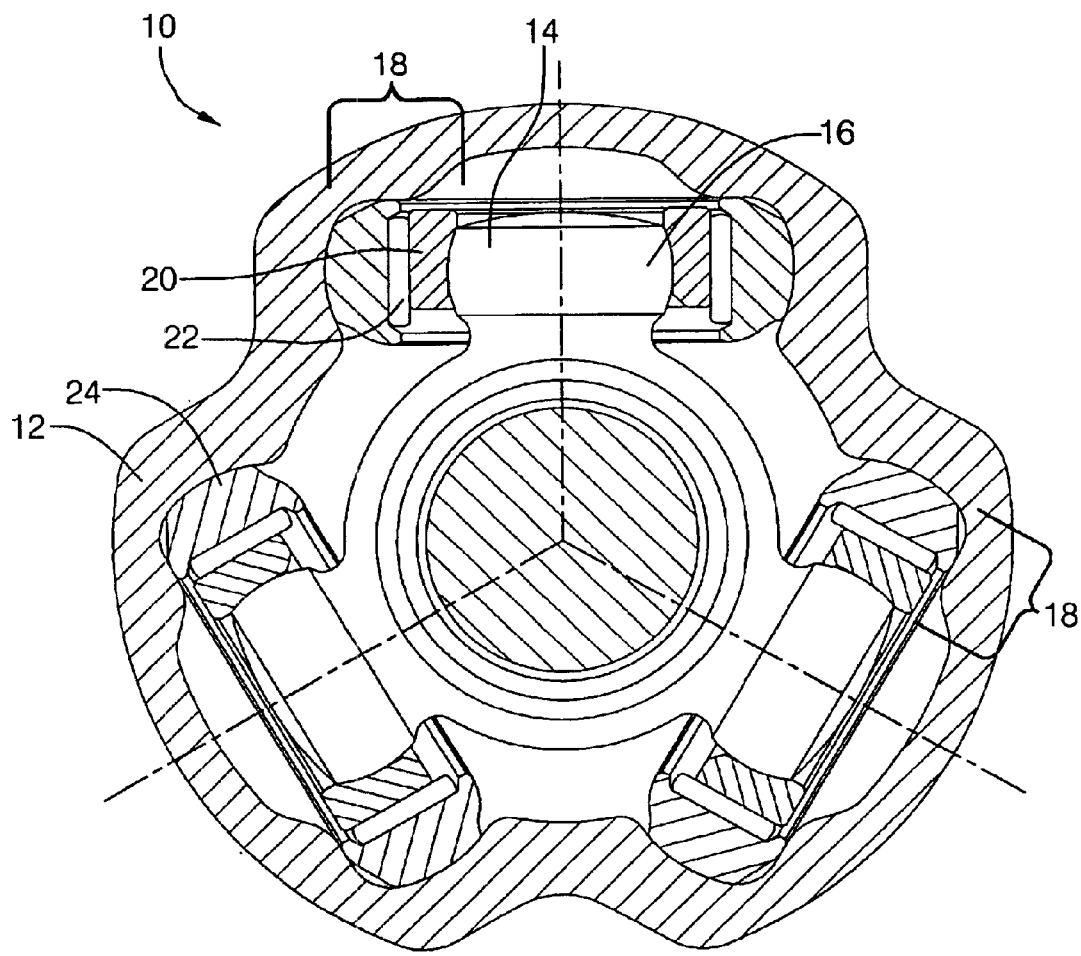
FIG. 1 is a cross-sectional view of a prior art tripot style joint.

Referring to FIG. 3, a tripot style joint 100 is shown. Similar to the tripot style joint 10, the tripot style joint 100 includes a tripot housing 112 formed with a ball guide, the interior grooves of the housing 112. That is, the housing 112 has an offset radius profile for the ball bore and an outer ball guide to help track the outer ball 124 relative to the housing axis. A tripot spider 114 includes a somewhat spherical trunnion 116, a ball assembly 118 having an inner ball 120, a complement of needle rollers 122, and an outer ball 124. The inner ball 120 has a spherical radius profile on the inner diameter that mates to the spherical profile of the spider trunnion 116 and a cylindrical outer diameter that mates with the needle rollers 122. The compliment of needle rollers 122 mates to the outer diameter of the inner ball 120 and the inner diameter of the outer ball 124. The outer ball 124 has a cylindrical inner diameter and a radius profile outer diameter to match the ball bore of the housing 112.

It should be understood that the tripot style joint 100 is shown in cross-section in FIG. 3. While the trunnion 116 may have a somewhat compressed spherical shape, it is within the scope of this invention to provide the trunnion 116 with a rod shape or cylindrical shape, either having a generally circular cross-section. In either case, the inner ball 120 and the outer ball 124 have generally cylindrical, tubular shapes where the inner ball 120 has a smaller outer diameter than the inner diameter of the outer ball 124. That is, the inner ball 120 and the outer ball 124 are arranged generally concentrically around the trunnion 116. By generally cylindrical, it is meant that the inner ball 120 and outer ball 124 possess tubular shapes, open in the middle with material extending 360 degrees around the open interior. The inner and outer surfaces of the inner ball 120 and outer ball 124, however, possess cylindrically extending grooves and varying curvatures, as shown by the cross-sectional view of FIG. 3. Thus, each trunnion 116 is surrounded by a single inner ball 120 possessing the cross-section shown on either side of the trunnion 116 and a single outer ball 124 possessing the cross-section shown on either side of the trunnion 116, each of the inner ball 120 and the outer ball 124 being toroids concentrically surrounding the trunnion 116.

Likewise, although only two needle rollers 122 are shown in cross-section on diametrically opposite sides of each trunnion 116, there are preferably a plurality of needle rollers 122 which surround each trunnion 116. Each needle roller 122 may have a pin shape with a circular cross section taken along a plane extending perpendicularly into the cross-sectional view shown in FIG. 3. Each pin shaped needle roller 122 is preferably placed in abutting fashion against an adjacent needle roller 122 until the trunnion 116 is completely surrounded by needle rollers 122. Thus, when reviewing FIG. 3, it should be understood that each trunnion 116 is preferably surrounded by a single inner ball 120, a plurality of needle rollers 122, and a single outer ball 124. Each needle roller 122 has a length measured along its longitudinal axis extending from its outer end 121 to its inner end 123. Preferably the length of each needle roller 122 is the same.

Figure 2:
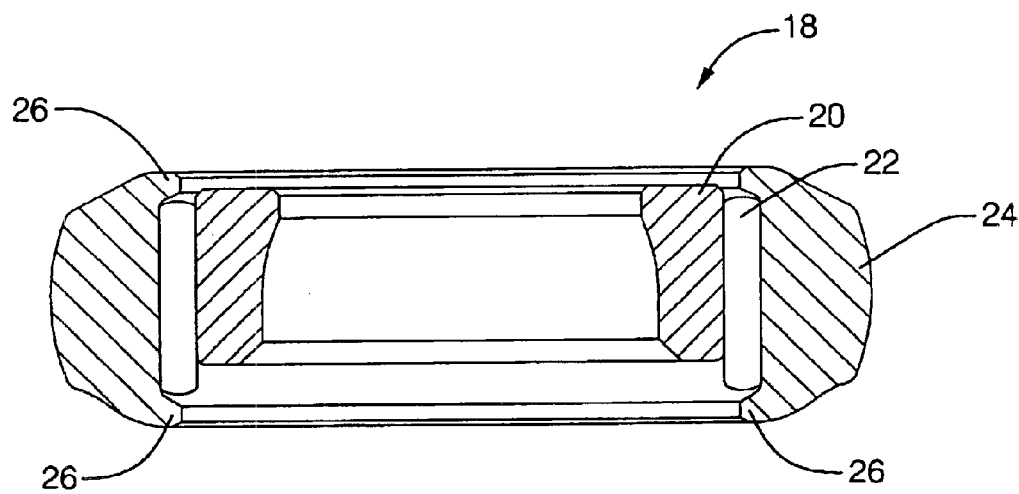
FIG. 2 is a cross-sectional view of the ball assembly used in the prior art tripot style joint of FIG. 1.

For eliminating the two shoulders 26 that form the cup shape of the outer ball 24 shown in FIGS. 1 and 2, two needle roller retainers 130 and 132, as more clearly shown in FIG. 4, are used in conjunction with the outer ball 124. The basic design of the retainers 130, 132, when assembled into the outer ball 124, forms a cup 134 for the compliment of needle rollers 122. Two retainers are required per ball assembly 118, an outer retainer 130 and an inner retainer 132.

Figure 6:
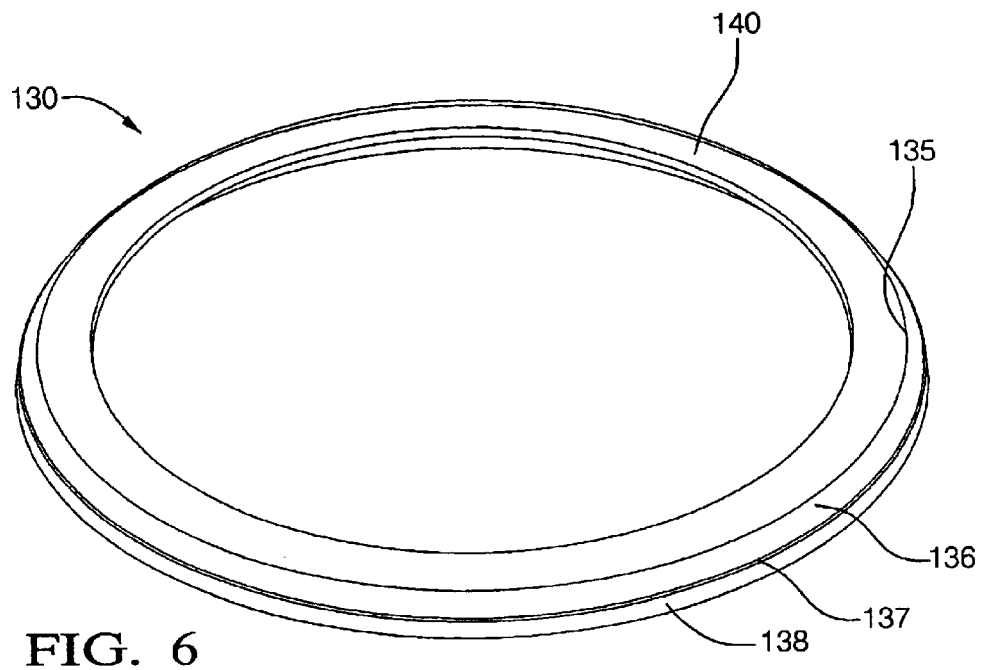
FIG. 6 is a perspective view of the retainer ring for use in the tripot style joint of FIG. 3; and, FIG. 7 is another perspective view of the retainer ring for use in the tripot style joint of FIG. 3.
Figure 7:
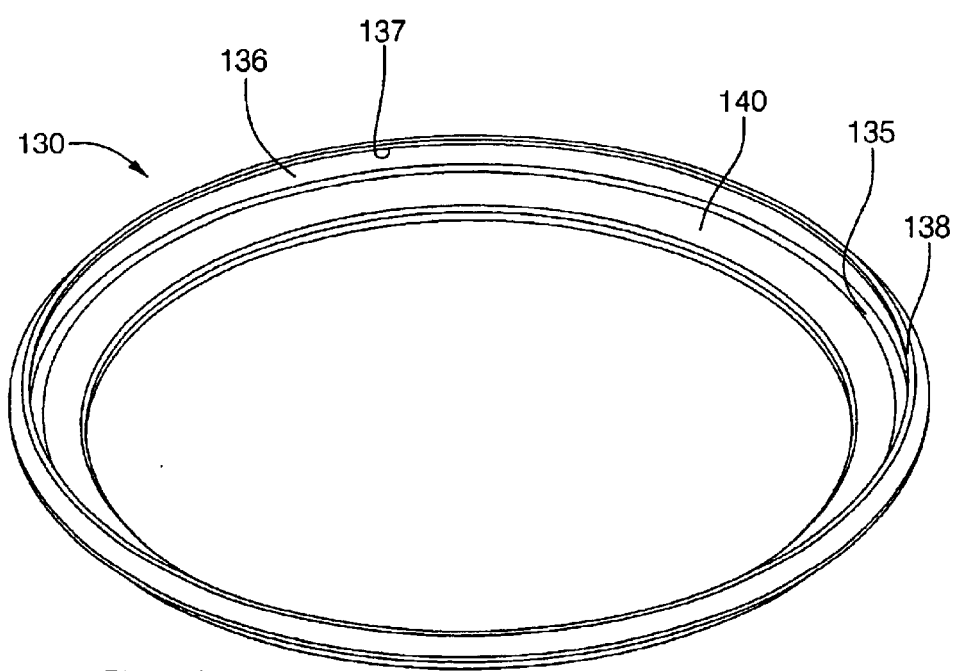

As shown in FIGS. 4, 6, and 7, the design of the retainers 130, 132 is generally ring-shaped and may include a cylindrical section 136 having an inner end 137 and an outer end 135 with a rib portion 138 on the inner end 137 and a ring shaped flange section 140,141 that retains the needle rollers 122 on the outer end 135. It should be noted that the rib portion 138 may form a continuous rib around the cylindrical section 136. Although FIGS. 6 and 7 show outer retainer 130, it should be understood that inner retainer 132 also includes a cylindrical section 136, a rib portion 138, and a flange section 141, although the dimensions may vary from the outer retainer 130 as will be described. The outer retainer 130 preferably has a flange diameter inner diameter that is larger than the outer diameter of the inner ball 120. The inner retainer 132 preferably has a flange inner diameter that is smaller than the inner ball outer diameter. Thus, the flange 141 of the inner retainer 132 is preferably wider than the flange portion 140 of the outer retainer 130, although, in an alternate embodiment, the outer and inner retainers 130, 132 could be designed having equal widths in their respective flange portions 140, 141. The inner retainer 132 prevents the outer ball 124 from disassembling from the inner ball 120 once the ball assembly 118 is attached to the spider trunnion 116.

It should be further noted that the flange section 140 extends at a non-zero angle from the cylindrical section 136. As shown in FIG. 4, it may be seen that an interior angle between the cylindrical section 136 and the flange section 140, 141 is preferably greater than 90 degrees and less than 180 degrees, thus an obtuse angle, although an angle equal to 90 degrees would also be within the scope of this invention, that is, to have the flange section 140, 141 perpendicular to the cylindrical section 136. The rib section 138 may be bulbous in shape to fit snugly within a correspondingly shaped groove 144, 146 in the outer ball 124 as will be described. The cylindrical section 136 preferably lies substantially flush with a somewhat flat portion 142 extending from the groove 144 or 146 to an outer edge 148, 150, respectively. As further shown in FIG. 4, the rib sections 138 are trapped between the needle rollers 122 and the outer ball 124 while the flange sections 140, 141 extend over the ends 121, 123 of the needle rollers 122, and not between the needle rollers 122 and the outer ball 124.

As shown in FIG. 5, the outer ball inner diameter profile design consists of a distance 152 between the two retaining ring grooves 144, 146. Because of the design of the needle retainers 130, 132, the distance 152 may be less than the length of the needle rollers 122, thus allowing for the compact ball assembly 118.

The needle retainers 130, 132 may be pressed into the outer ball 124 until the rib sections 138 snap into the retainer grooves 144, 146. Although a snap-fit connection is disclosed, alternate methods for retaining the needle retainers 130, 132 upon the outer ball 124 are within the scope of this invention. The retainers 130, 132 are held in place by the needle rollers 122 extending over the cylindrical sections 136 of the retainers 130, 132. In an alternate embodiment, another possible retainer connection may include injection molding a plastic material with a similar shape into the outer ball. This type of connection would not require any press together or press fit operation, but would be formed into the outer ball and retained by the needle rollers.

The needle retainers 130, 132 may be formed from spring steel and the outer ball 124 may be made of bearing steel, although alternate materials usable in the tripot joint 100 are within the scope of this invention.

An advantage of the ball assembly 118 over previously known ball assemblies is the elimination of the costly cup-shaped ball design. A further advantage is the ability to maintain the compact size of the outer ball while using a pair of retaining rings, thus maintaining, and potentially even decreasing, the package size and the mass of the tripot joint.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A ball assembly for a tripot style joint, the ball assembly comprising:

an outer ball having a cylindrical shape and having a first ring shaped groove on an interior of the cylindrical shape;

a first needle roller retainer having
a cylindrical portion having an inner end and an outer end;
a rib portion extending from the inner end of the cylindrical portion; and,
a flange portion extending from the outer end of the cylindrical portion, wherein the flange portion forms a non-zero angle with the cylindrical portion; and, needle roller positioned within an interior of the outer ball;

wherein the rib portion of the first needle roller retainer fits snugly within the first ring shaped groove and wherein an inner surface of the cylindrical portion of the first needle roller retainer abuts the needle roller.

2. The ball assembly of claim 1, wherein the flange portion is ring-shaped.

3. The ball assembly of claim 1 comprising:
a cylindrical groove on an interior of the having end and an inner end of the extending from the outer rib portion shaped groove and wherein the rib portion is bulbous and forms a continuous rib around the cylindrical portion.

4. The ball assembly of claim 3, wherein the rib portion forms a snap fit connection with the first ring shaped groove in the outer ball.

5. The ball assembly of claim 1 wherein an outer surface of the cylindrical portion of the first needle roller retainer abuts the outer ball.

6. The ball assembly of claim 1 further comprising a plurality of needle rollers, wherein the first needle roller retainer is held in place by the plurality or needle rollers.

7. A ball assembly for a tripot style joint, the ball assembly comprising:
an outer ball having a cylindrical shape and having a first ring shaped groove on an interior of the cylindrical shape and a second ring shaped groove on the interior of the cylindrical shape;
a first needle roller retainer having
a cylindrical portion having an inner end and an outer end;
a rib portion extending from the inner end of the cylindrical portion; and,
a flange portion extending from the outer end of the cylindrical portion;
a second needle roller retainer having
a cylindrical portion having an inner end and an outer end;
a rib portion extending from the inner end of the cylindrical portion of the second needle roller retainer; and,
a flange portion extending from the outer end of the cylindrical portion of the second needle roller retainer; and,
a needle roller positioned within an interior of the outer ball;
wherein the rib portion of the first needle roller retainer fits snugly within the first ring shaped groove and wherein the rib portion of the second needle roller retainer fits snugly within the second ring shaped groove; and,
wherein a length of the needle roller measured along its longitudinal axis from an outermost end to an innermost end of the needle roller being longer than a distance measured from the first ring shaped groove to the second ring shaped groove.

8. The ball assembly of claim 7, further comprising a plurality of needle rollers, the plurality of needle rollers having equal lengths.

9. The ball assembly of claim 7, wherein the flange portion of the first needle roller retainer extends over an outer end of the needle roller and the flange portion of the second needle roller retainer extends over an inner end of the needle roller.

10. A ball assembly for a tripot style joint, the ball assembly comprising:
an outer ball having a cylindrical shape and having a first ring shaped groove on an interior of the cylindrical shape and a second ring shaped groove on the interior of the cylindrical shape;
a first needle roller retainer having
a cylindrical portion having an inner end and an outer end;
a rib portion extending from the inner end of the cylindrical portion; and,
a flange portion extending from the outer end or the cylindrical portion;
a second needle roller retainer having
a cylindrical portion having an inner end and an outer end;
a rib portion extending from the inner end of the cylindrical portion of the second needle roller retainer; and,
a flange portion extending from the outer end of the cylindrical portion of the second needle roller retainer;
wherein the rib portion of the first needle roller retainer fits snugly within the first ring shaped groove and wherein the rib portion of tho second needle roller retainer fits snugly within the second ring shaped groove; and,
wherein the flange portion of the second needle roller retainer has a greater width than a width of the flange portion of the first needle retainer.

11. A ball assembly for a tripot style joint, the ball assembly comprising:
an outer ball having a cylindrical shape and having a first ring shaped groove on an interior of the cylindrical shape;
a first needle roller retainer having
a cylindrical portion having an inner end and an outer end;
a rib portion extending from the inner end of the cylindrical portion; and,
a flange portion extending from the outer end of the cylindrical portion; and,
a needle roller positioned within an interior of the outer ball;
wherein the rib portion of the first needle roller retainer fits snugly within the first ring shaped groove and wherein the first needle roller retainer is held in place by the needle roller;
wherein the rib portion of the first needle roller retainer is trapped between the outer ball and the needle roller.

12. A ball assembly for a tripot style joint, the ball assembly comprising:
an outer ball having a cylindrical shape and having a first ring shaped groove on an interior of the cylindrical shape;
a first needle roller retainer having
a cylindrical portion having an inner end and an outer end;
a rib portion extending from the inner end of the cylindrical portion; and,
a flange portion extending from the outer end of the cylindrical portion;
wherein the rib portion of the first needle roller retainer fits snugly within the first ring shaped groove and wherein the cylindrical portion of the first needle retainer lies flush with a flat portion of the interior of the cylindrical shape of the outer ball, the flat portion lying between the first ring shaped groove in the outer ball and an outer edge of the outer ball.

13. A tripot style joint comprising:

a ball assembly, the ball assembly having an outer ball having a cylindrical shape and having a first ring shaped groove on an interior of the cylindrical shape;

a first needle roller retainer having a cylindrical portion having an inner end and an outer end;

a rib portion extending from the inner end of the cylindrical portion; and, a flange portion extending from the outer end of the cylindrical portion;

a needle roller positioned within an interior of the outer ball;

wherein an inner surface of the cylindrical portion of the first needle roller retainer abuts the needle roller, an outer surface of the cylindrical portion of the first needle roller retainer abuts the outer ball, the first needle roller retainer is held in place by the needle roller, and the rib portion of the first needle roller retainer fits snugly within the first ring shaped groove; and, a tripot spider, the ball assembly surrounding a trunnion in the spider.

14. The tripot style joint of claim 13, wherein the flange portion forms a non-zero angle with the cylindrical portion.

15. The tripot style joint of claim 13 further comprising a plurality of needle rollers, wherein the first needle roller retainer is held in place by the plurality of needle rollers.

16. The ball assembly of claim 13 wherein the rib portion forms a continuous rib around the cylindrical portion.

17. A ball assembly for a tripot style joint, the ball assembly comprising:

an outer ball having a cylindrical shape and having a first ring shaped groove and a second ring shaped groove on an interior of the cylindrical shape;

a first needle roller retainer having a cylindrical portion having an inner end and an outer end;

a rib portion extending from the inner end of the cylindrical portion; and, a flange portion extending from the outer end of the cylindrical portion, wherein the flange portion forms a non-zero angle with the cylindrical portion;

a second needle roller retainer having a cylindrical portion having an inner end and an outer end;

a rib portion extending from the inner end of the cylindrical portion of the second needle roller retainer; and, a flange portion extending from the outer end of the cylindrical portion of the second needle roller retainer;

wherein the rib portion of the first needle roller retainer fits snugly within the first ring shaped groove and wherein the rib portion or the second needle roller retainer fits snugly within the second ring shaped groove.

18. The ball assembly of claim 17 further comprising a needle roller positioned within an interior of the outer ball, wherein the first needle roller retainer is held in place by the needle roller.

19. The ball assembly of claim 17 further comprising a plurality of needle rollers, wherein the first needle roller retainer is held in place by the plurality of needle rollers.

* * * * *